UNITED STATES PATENT OFFICE.

ADOLPH MELZER AND CHARLES MELZER, OF EVANSVILLE, INDIANA.

COMPOUND FOR PURIFYING WATER.

SPECIFICATION forming part of Letters Patent No. 322,839, dated July 21, 1885.

Application filed July 16, 1884. (No specimens.)

*To all whom it may concern:*

Be it known that we, ADOLPH MELZER and CHARLES MELZER, both of the city of Evansville, in the county of Vanderburg and State of Indiana, have invented a certain new and useful Compound for Purifying and Preparing Water for Industrial Purposes, of which the following is a full, clear, and exact description.

The water ordinarily used for industrial and household purposes is the water of rivers, lakes, wells, or springs, furnished by the public supply, or taken direct from the sources mentioned. These waters all contain more or less of earthy salts in solution, principally bicarbonates and sulphates of lime and magnesia, aside from the mineral and organic matter they hold in suspense. These salts are very objectionable in many processes for which water is used, particularly in the process of washing clothes, which latter we will select to illustrate the usefulness of our invention.

In washing, the chemical agent universally employed in connection with water is soap; and if a good quality of soap is used with distilled water, or rain-water which has been previously heated to expel the free carbonic acid generally contained therein, the clothes are quickly and satisfactorily cleansed by the ordinary method. However, water of this kind is not generally available, and by far the most water used is the kind first mentioned. Now, when river, lake, or well water is employed for washing, the instant soap is dissolved therein a chemical reaction takes place, resulting in a decomposition of the soap and the formation of new combinations in the following manner: The carbonic and sulphuric acids which are component parts of the earthy salts leave their combinations to seize upon the alkaline base of the soap, for which they have greater affinity, and form therewith carbonate and sulphate of soda, while the fatty and resinous acids of the soap, now deprived of their alkaline base, combine with the free lime and magnesia to form an insoluble compound, (the well-known flakes observed when soap is dissolved in hard water.) The quantity of soap thus lost varies according to the percentage of earthy salts contained in the water, and in order to ascertain the quantity of these salts in the waters mostly used in our country we have carefully analyzed samples of the water furnished by the public supplies in fifty-one principal cities of the United States, and find the quantity varies from 1.39 to 25.50 grams of bicarbonate of lime or its equivalent in one hundred thousand grams of water, and the average is 8.68 grams.

The average quantity of water used for an ordinary family washing is about twelve gallons, (this does not include the water used for rinsing and bluing,) and if we accept the before-mentioned average percentage of earthy salts as a basis for our calculations, fifty-seven grams or one-seventh the quantity of soap ordinarily required for a washing is decomposed before the chemical reaction described ceases. From this it will be seen that a very considerable portion of the soap used daily for washing is lost, being converted into new combinations which have no value in the process referred to. But not this alone. A more serious result of the chemical reaction caused by the earthy salts in the water is the insoluble compound formed by the union of the fatty and resinous acids of the soap with the lime and magnesia. This settles firmly into the meshes and upon the fibers of the clothes, imparting to them a yellow tinge and disagreeable odor, which can be removed only with great difficulty. The object of our invention is to prevent this action of the earthy salts before mentioned by converting them into alkaline sulphates and carbonates of lime and magnesia before soap is introduced into the water. Neither the alkaline sulphates nor the earthy carbonates have any chemical action upon the soap or clothes, and the latter, (the earthy carbonates,) together with the mineral and organic matter that is suspended in the water, are by the action of our chemical compound precipitated, and may be entirely removed from the water. To effect this we use a very pure carbonated alkali, viz., carbonate of soda or potash, or a mixture of both, preferably in the concentrated form of an anhydrous and finely-ground powder. This dissolves readily in a little warm water, and when thus added to the water used for washing converts the bicarbonates in the water into simple carbonates of lime and magnesia, which are insoluble and are precipitated, while the sulphates exchange bases with the carbonated alkali to form an alkaline sulphate and carbonate of lime and magnesia, which latter again precipitates.

In compounding our preparation we are governed by the percentage of earthy salts contained in the water, and use a quantity of carbonated alkali proportionate to or slightly in excess of the amount required to neutralize the effects of the earthy salts in the water, according to the purpose for which the water is intended. Thus, in preparing our compound for laundry use, we put up for a family washing twenty grams of pure pulverized anhydrous carbonate of soda or its equivalent of carbonate of potash, or a mixture of both, with ten grams pulverized starch, a small quantity of indigo or an aniline color, and a few drops of oil-lavender or other essential oil, all thoroughly mixed. This we inclose in a strong paper envelope and put up in connection with cakes or bars of soap. The pulverized starch or other absorbent is used to prevent the alkali from caking. The indigo or aniline imparts to the preparation a pleasing color, and the essential oil an agreeable perfume. The quantity of carbonated alkali mentioned before is sufficient to neutralize the effects of nineteen grams bicarbonate of lime or its equivalent in twelve gallons water, which is rather more than the average water contains. However, we find by making careful practical tests that this quantity produces the best results, and the excess of carbonated alkali in the water is by no means injurious, tending only to reduce the quantity of soap required for washing.

When it is desired to prepare water for any of the various processes in the arts and industries requiring a delicate adjustment of the compound to the percentage of earthy salts in the water, a volumetric analysis or hardness determination may be quickly made according to Clark's method by one versed in analytical chemistry, and the quantity required of the compound established.

Having now fully explained our invention and its use, what we claim as a new and useful article of commerce, and desire to secure by Letters Patent, is—

1. A compound for purifying and preparing water for industrial and washing purposes, consisting of pulverized anhydrous carbonate of soda or potash, or a mixture of both, to which is added starch or other absorbent, substantially as set forth.

2. A compound for purifying and preparing water for industrial and washing purposes, consisting of pulverized anhydrous carbonate of soda, potash, or both, mixed with an absorbent, and a coloring-matter, such as indigo, indigotine, ultramarine, aniline, &c., substantially as set forth.

3. A compound for purifying and preparing water for industrial and washing purposes, consisting of carbonated alkali, an absorbent, a coloring matter, and a perfume, substantially as set forth.

ADOLPH MELZER.
CHAS. MELZER.

Witnesses:
PETER RETTIG,
JACOB H. PLEGGE.